(12) United States Patent
Merrill et al.

(10) Patent No.: US 9,186,866 B2
(45) Date of Patent: Nov. 17, 2015

(54) POWDER-BASED MATERIAL SYSTEM WITH STABLE POROSITY

(75) Inventors: Gary B. Merrill, Orlando, FL (US); Cora Schillig, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 983 days.

(21) Appl. No.: 13/346,767

(22) Filed: Jan. 10, 2012

(65) Prior Publication Data
US 2013/0177740 A1 Jul. 11, 2013

(51) Int. Cl.
| | |
|---|---|
| *B32B 7/02* | (2006.01) |
| *B32B 5/30* | (2006.01) |
| *B32B 3/00* | (2006.01) |
| *C04B 37/02* | (2006.01) |
| *B22F 3/105* | (2006.01) |
| *B22F 5/00* | (2006.01) |
| *B22F 7/00* | (2006.01) |
| *B82Y 30/00* | (2011.01) |
| *B32B 3/26* | (2006.01) |

(Continued)

(52) U.S. Cl.
CPC . *B32B 7/02* (2013.01); *B22F 3/105* (2013.01); *B22F 5/009* (2013.01); *B22F 7/002* (2013.01); *B32B 3/26* (2013.01); *B32B 5/30* (2013.01); *B82Y 30/00* (2013.01); *C04B 37/021* (2013.01); *B22F 3/1017* (2013.01); *B22F 3/1112* (2013.01); *B32B 2264/105* (2013.01); *B32B 2264/107* (2013.01); *B32B 2307/304* (2013.01); *C04B 2235/34* (2013.01); *C04B 2235/5436* (2013.01); *C04B 2235/5454* (2013.01); *C04B 2235/5472* (2013.01); *C04B 2235/666* (2013.01); *C04B 2235/9607* (2013.01); *C04B 2237/343* (2013.01); *C04B 2237/348* (2013.01); *C04B 2237/403* (2013.01); *C04B 2237/405* (2013.01); *C04B 2237/64* (2013.01); *C04B 2237/704* (2013.01); *Y10T 428/24496* (2015.01); *Y10T 428/24942* (2015.01); *Y10T 428/249969* (2015.04)

(58) Field of Classification Search
CPC ...... B32B 7/02; B32B 5/30; B32B 2264/105; B32B 2264/107; B32B 15/04; B32B 18/00; C04B 38/009; C04B 38/08; C04B 38/085; C04B 2235/528; C04B 2235/5454; C04B 2237/30–2237/385; C04B 2237/40–2237/408
See application file for complete search history.

(56) References Cited

U.S. PATENT DOCUMENTS

| | | | | | |
|---|---|---|---|---|---|
| 3,284,174 | A | * | 11/1966 | Frantisek Zimmer | .... B22F 7/00 228/122.1 |
| 4,283,441 | A | * | 8/1981 | Haecker | ................ C04B 35/486 204/424 |
| 4,296,148 | A | * | 10/1981 | Friese | ..................... B32B 18/00 204/426 |

(Continued)

*Primary Examiner* — Erin Snelting

(57) ABSTRACT

A powder-based material system having an intrinsic and stable degree of porosity provided by hollow ceramic spheres (26) in a fully dense matrix (27). A substrate (22) is formed from a metal powder (70), and may be partially sintered (60). A layer (24) of ceramic powder is arranged on the substrate including the pre-sintered hollow ceramic spheres plus a proportion of nano-sized ceramic particles effective to reduce the layer sintering temperature and to increase the sintering shrinkage of the layer to approximate that of the metal substrate during subsequent co-sintering. The substrate and layer are then co-sintered (61), such as with spark plasma sintering (32, 34, 36), at a temperature and for a duration to fully densify the ceramic powder matrix around the hollow spheres, thereby producing a metal/ceramic material system with low interface stress and with stable porosity during operational temperatures in a gas turbine engine.

7 Claims, 5 Drawing Sheets

(51) Int. Cl.
  *B22F 3/10* (2006.01)
  *B22F 3/11* (2006.01)

(56) References Cited

U.S. PATENT DOCUMENTS

| | | | |
|---|---|---|---|
| 4,434,211 A * | 2/1984 | Shoher | A61C 5/08 419/9 |
| 4,769,294 A * | 9/1988 | Barringer | C04B 35/111 156/89.16 |
| 4,835,039 A * | 5/1989 | Barringer | C04B 41/5133 106/1.05 |
| 5,279,909 A * | 1/1994 | Horner | C04B 35/63492 228/170 |
| 5,350,637 A * | 9/1994 | Ketcham | B32B 15/04 156/89.28 |
| 5,455,000 A * | 10/1995 | Seyferth | B22F 7/04 419/10 |
| 5,908,713 A | 6/1999 | Ruka et al. | |
| 6,235,370 B1 | 5/2001 | Merrill et al. | |
| 6,384,365 B1 | 5/2002 | Seth et al. | |
| 6,576,182 B1 * | 6/2003 | Ravagni | B32B 18/00 210/490 |
| 6,641,907 B1 | 11/2003 | Merrill et al. | |
| 6,939,603 B2 | 9/2005 | Oechsner | |
| 6,953,603 B2 * | 10/2005 | Nonninger | C03C 17/007 427/226 |
| 7,182,581 B2 | 2/2007 | Bostanjoglo et al. | |
| 7,247,002 B2 | 7/2007 | Albrecht et al. | |
| 7,387,758 B2 | 6/2008 | Merrill et al. | |
| 7,413,798 B2 | 8/2008 | Burns et al. | |
| 7,648,605 B2 | 1/2010 | Merrill et al. | |
| 7,744,351 B2 | 6/2010 | Jabado et al. | |
| 8,101,280 B2 * | 1/2012 | Akarsu | C09D 1/00 427/372.2 |
| 2003/0080477 A1 * | 5/2003 | Merrill | B28B 1/265 264/637 |
| 2003/0111714 A1 * | 6/2003 | Bates | H01L 23/66 257/678 |
| 2003/0142463 A1 * | 7/2003 | Nakamura | B32B 18/00 361/321.2 |
| 2004/0009333 A1 * | 1/2004 | Miyazaki | B32B 18/00 428/209 |
| 2007/0205102 A1 * | 9/2007 | Scholl | C23C 14/3407 204/298.12 |
| 2007/0237667 A1 * | 10/2007 | Merrill | C04B 38/08 419/5 |
| 2010/0119777 A1 | 5/2010 | Merrill et al. | |
| 2013/0052415 A1 * | 2/2013 | Burns | B22F 3/22 428/141 |
| 2013/0052442 A1 * | 2/2013 | Merrill | B22F 7/02 428/220 |
| 2013/0307123 A1 * | 11/2013 | Song | H01L 33/0079 257/618 |

* cited by examiner

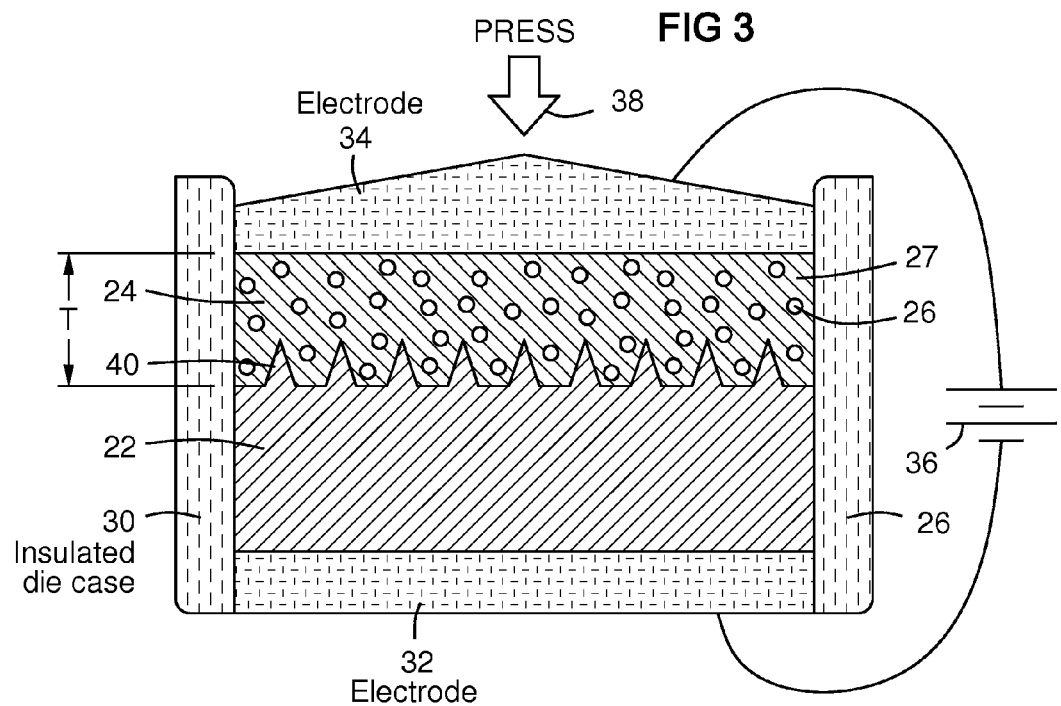
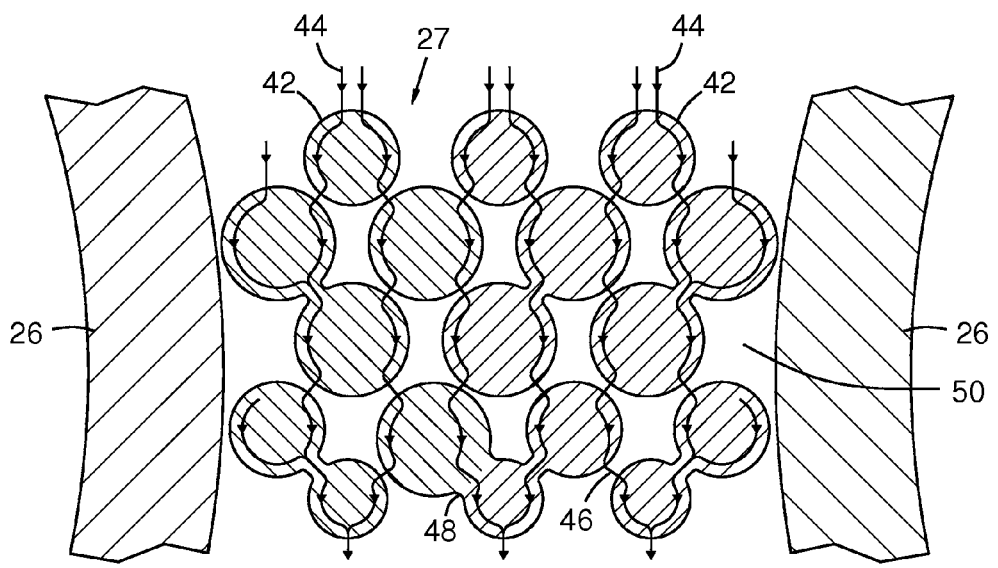

POWDER-BASED MATERIAL SYSTEM WITH STABLE POROSITY

FIELD OF THE INVENTION

The invention relates to material systems for components in the hot gas path of a gas turbine, and particularly to methods and compositions for fabricating a metal substrate with a ceramic thermal barrier layer.

BACKGROUND OF THE INVENTION

Metal components in the working gas path in a gas turbine engine may have a ceramic thermal barrier coating (TBC). Random voids can form in the TBC from sintering shrinkage during processing. These voids can be beneficial for thermal insulation, but detrimental to durability of the TBC and the metal substrate. The amount and size of voids formed and the resulting porosity are not controlled variables. High temperatures in the gas turbine environment can cause changes in the properties of the ceramic TBC, including further sintering, that can lead to spalling of the TBC. Additionally, the thickness of a ceramic TBC is limited due to the mismatch of processing shrinkage between the ceramic coating and the metallic substrate and from differential thermal expansion during operation cycles. This thinness limits the amount of oxidation protection, abrasion protection, and insulation that can be provided by a TBC, and limits its life.

A common method of joining of ceramic coatings to metal substrates is by surface deposition techniques such as High Velocity Oxygen Fuel spraying (HVOF), Air Plasma Spraying (APS), and Physical Vapor Deposition (PVD). However, these methods provide a non-chemical bond with limited durability.

Ceramic powders and metal powders can be formed into desired shapes, and then sintered to form dense bodies that can be structural. Such fabrication offers rapid manufacturing of net-shape parts. However, the sintering shrinkage of typical metal powders is about 6%, while that of typical ceramic powders is about 1%, and ceramics require much higher sintering temperatures than metals. These sintering disparities, plus different thermal expansion rates and different mechanisms of bonding between atoms, make a stress free bonding of ceramics to metals very difficult under normal circumstances. Such bonding is needed for ceramic coatings on metal components of gas turbine engines, where the ceramic coating serves as a thermal barrier and/or provides object impact resistance and/or desirable abrasion characteristics. Some gas turbine components are exposed to temperatures that cycle from ambient temperatures to about 1,500° C. between shut-down and operational phases of the gas turbine. Operation at such high temperatures causes continued densification of the ceramic material over time.

BRIEF DESCRIPTION OF THE DRAWINGS

The invention is explained in the following description in view of the drawings that show:

FIG. 3 shows an apparatus and method of spark plasma sintering of a ceramic thermal barrier coating on a metal substrate.

FIG. 4 shows current flows through ceramic powder particles during the method of FIG. 3.

DETAILED DESCRIPTION OF THE INVENTION

The present invention provides a sintered powder structure that is stable during high temperature operation (i.e. it behaves like a fully dense material not subject to further sintering), yet it contains a known and stable amount of porosity. The inventors have recognized that if a powder-based material system could be formed with stable hollow shapes such as hollow ceramic spheres having fully dense walls in a fully dense ceramic matrix, the material system would provide a specific intrinsic volume fraction of voids, and would not further sinter. This would prevent a further change of porosity or a change in system properties during subsequent high temperature operational conditions. Such a material system with temperature-stable porosity enables an abradable coating that can be used in otherwise non-reachable temperature regimes, for example enabling an abradable ceramic material that can be used at operating temperatures up to 1500° C. in one embodiment. Such a material system is thereby made fully dense except for a stable degree of porosity defined by the internal voids in the plurality of hollow spheres. The intrinsic and unchanging porosity would improve protection of the metal substrate compared to known porous ceramic coatings by providing a stable degree of thermal conductivity and abradability during subsequent use of the material under operational conditions. Furthermore, the fully dense matrix material and hollow spheres will function as a strong ligament structure surrounding the porosity, thereby providing more strength for a given amount of porosity than with prior art sprayed coatings where the porosity is distributed throughout the structure. Alternatively, a higher degree of porosity may be formed in a material of the present invention for a given degree of strength. While prior art air plasma sprayed YSZ ceramic coatings may be formed with porosity on the order of 10%, embodiments of the present invention may be formed with porosity levels of at least 20%, 25%, 50%, 60% or 70% in various embodiments.

Figure 1:
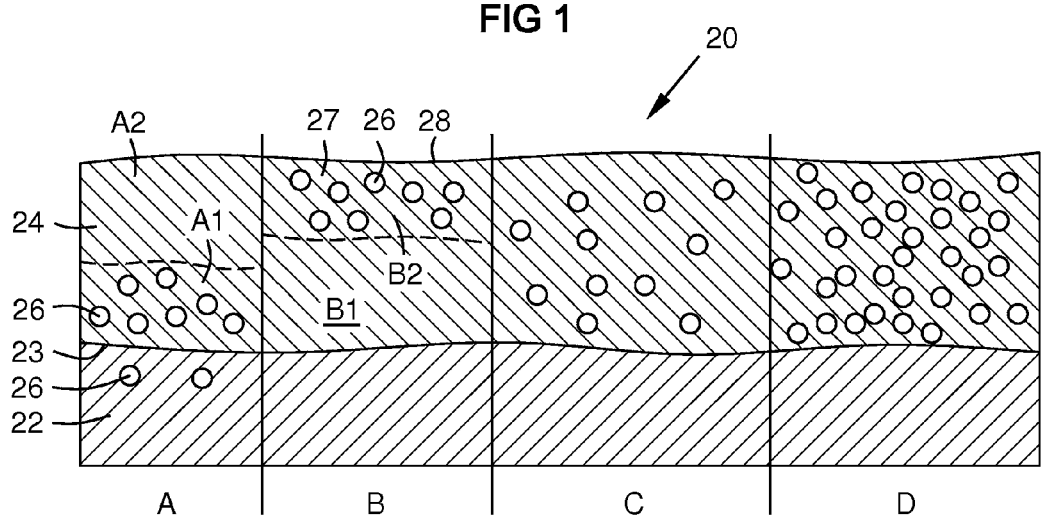
FIG. 1 illustrates a material system comprising a metal substrate with a thermal barrier coating, showing four exemplary distributions of hollow ceramic spheres.

FIG. 1 illustrates one such material system 20 comprising a metal substrate 22 with a ceramic thermal barrier coating 24, and an interface region 23 between them. Four exemplary distributions A-D of hollow shapes 26 in a ceramic matrix 27 are shown. The hollow shapes 26 may be hollow ceramic spheres, as illustrated, hollow ceramic fibers, or other hollow product of any material able to withstand the expected processing and operational temperatures and pressures without structural failure leading to a loss of hollow volume. In example A, the spheres 26 are concentrated proximate the interface region 23 to provide more compliance via porosity along that region, optionally with some of the spheres also provided in the metal substrate 22 proximate the interface region 23. This is beneficial in applications where high mechanical loads are experienced. In this embodiment, less or no porosity may be provided at the outer surface 28 of the TBC for maximum impact resistance. Example A may be formed by arranging a first mixture A1 of ceramic powder and hollow spheres on the substrate 22, then arranging a second mixture A2 of the same or a different ceramic powder without spheres on the first mixture, then sintering the material system 20 as later described. The substrate 22 may first be formed of compressed metal particles, optionally including some hollow shapes such as hollow ceramic spheres 26 being the same as those used in the ceramic layer 24 or having different properties such as at least one of size, material, or wall thickness, for example hollow metal spheres. Optionally, the first mixture A1 may be partly sintered before adding the second mixture A2. In example B, the spheres are concentrated proximate the outer surface 28 of the TBC 24. This is beneficial where abradable surface properties are required, such as on turbine blade ring segments. Example B may be formed by arranging a first mixture B1 of ceramic powder without spheres on the substrate 22, then arranging a second mixture B2 of the same or a different ceramic powder with spheres 26 on the first mixture B1, then sintering the material system 20 as later described. Optionally, the first mixture B1 may be partly sintered before adding the second mixture B2. Examples A and B may be "graded", having a gradually varying volume fraction of spheres 26 between the interface 23 and the outer surface 28. This can be done by multiple sub-layering of the TBC 24 with gradually different volume fractions of spheres in each sub-layer. Examples C and D illustrate how the porosity, and thus the thermal conductivity K, can be controlled by the volume fraction of the spheres. In another embodiment, no spheres may be included in the layer 24. The higher the volume fraction of spheres, the lower the thermal conductivity K. This versatility allows tailoring of the system 20 to meet heat transfer and structural requirements.

Figure 2:
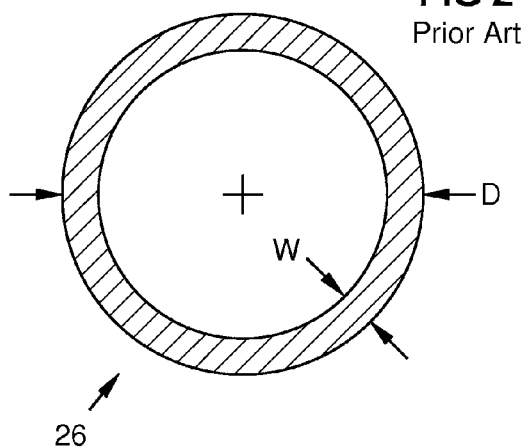
FIG. 2 is a sectional view of a hollow ceramic sphere as known in the art.

FIG. 2 shows a sectional view of a hollow ceramic sphere 26 with a wall thickness W. The spheres may be sintered to full wall density prior to mixing with the ceramic powder of the matrix 27 or of the metal substrate 22, or at least to a density at which they have adequate strength to withstand subsequent processing steps without losing the integrity of their internal void space. The sphere walls have thickness W relative to the sphere diameter D, and a degree of pre-sintering, that prevents crushing of the spheres during processing pressure later described. Herein "crushing" of a sphere means flattening it to less than a 0.7 aspect ratio or splitting the sphere wall enough for particles to enter the sphere, both of which would lead to an undesirable reduction in the intrinsic porosity of the layer. Exemplary spheres may have a wall thickness in a range from 0.08 D to 0.20 D, depending on the material of the sphere and the processing pressure to be used. Processing pressure may be reduced by methods later described, including spark plasma sintering and inclusion of ceramic nano-particles in the ceramic matrix 27. Exemplary spheres may be made of Yttria doped $ZrO_2$ or $Al_2O_3/MgO$ or another ceramic, with a diameter D in the range of 200-1000 microns.

FIG. 3 illustrates a process of sintering a TBC 24 on a metal substrate 22 using spark plasma sintering (SPS). This process produces a layer having a fully dense matrix material containing fully sintered hollow spheres, thereby providing the unique structure of a fully densified porous layer. Pre-sintered ceramic spheres 26 may be mixed with a ceramic powder that will form the matrix 27. This mixture may be arranged in a layer 24 on a substrate 22 in an electrically insulated die case 30 with SPS electrodes 32, 34. The layer 24 may be compressed to a more compact state prior to sintering. A voltage source 36 provides an electrical potential between the electrodes 32, 34. Mechanical pressure 38 may be applied to the ceramic and metal powder system during sintering to consolidate the matrix 27 as it shrinks, eliminating shrinkage voids. This pressure may range from about 10 to 50 MPa, depending on the matrix materials, the voltage, and is inversely related to the percentage of ceramic nano-particles in the matrix. The substrate 22 may be pre-formed of partially pre-sintered metal powder as later described, and may include interlocking surface features 40.

The ceramic powder may be mixed with a binder. The binder allows the ceramic powder to flow around and to mechanically engage any protruding undercut or other geometric surface feature 40 on the substrate in order to reinforce the chemical bond formed there between. The binder used for the ceramic powder may have a lower working temperature than any binder used for the substrate so that the substrate material is not softened. Alternatively, the binder may have the same working temperature if the substrate has solidified initially. The binder is organic in nature and is removed prior to the SPS operation. This would typically take place in an air oven at intermediate temperatures, thereby producing a weak green body which is placed into the SPS die case 30 prior to high temperature processing. Voltage may then be applied across the ceramic powder and substrate through electrodes 32, 34 effective to produce spark plasma sintering in both layers 22, 24 effective to sinter both layers to a desired final density, including a full density of matrix 27. One of the electrodes 34 may be a piston that compresses the ceramic layer 24 during sintering.

FIG. 4 illustrates spark plasma sintering (SPS) of ceramic particles 42 of the matrix 27 between ceramic spheres 26. The electric current 44 of SPS generates high heat exactly where it is needed, directly between 46 the particles 42, fusing them 48 efficiently with minimal heating. After two particles fuse 48, the gap 46 is eliminated, which eliminates the arc between them, preventing excess heating, As sintering progresses, the interparticle spaces 50 are reduced without combining into larger voids. This is partly due to the SPS sintering process itself and partly due to mechanical compression 38 (FIG. 3) with interparticle gas release that reduces the thickness T of the TBC during sintering.

The size of the spheres 26 and their fractional proportion in the matrix 27 may be designed to avoid columns, clumps, or 3D chain structures of touching spheres that oppose compression of the ceramic layer to be sintered. This allows a uniform reduction in thickness T of the layer 24 by consolidation of the matrix 27 during sintering. To achieve this goal, the mean sphere diameters may be limited to less than a maximum fraction of the final ceramic coating thickness, such as 10% to 20%, and the volume fraction of the spheres may be limited to a respective maximum, such as 60% to 40%, or 70% in another embodiment. As an example, for a ceramic coating that is to be finally 2 mm thick, the spheres may be selected or formed with diameter D=300 microns and wall thickness W=30 microns, and they may be mixed in the TBC up to a volume fraction of 50%. The volume fraction may be increased above the specified maximum in sub-layers such as A1 and B2 (FIG. 1) where an adjacent low-porosity sub-layer lacks spheres or has a reduced fraction of spheres, thus allowing full consolidation and densification of at least the low-porosity sub-layer.

A further optional aspect of the invention is to co-process a metal substrate and a ceramic layer thereon in a way that minimizes the sintering shrinkage differential between them. The metal may be a refractory elemental metal or a refractory alloy, such as one based on chromium (Cr), molybdenum (Mo), niobium (Nb), tantalum (Ta), tungsten (W), or iron (Fe). A metal powder may be mixed with a formable binder, and formed into a substrate that may have engineered surface features. Optionally, the substrate may be partially sintered to a predetermined degree, such as about 85-90% of its full density. Herein, "full density" or "fully dense" means at least 97% of the theoretical density of a given material at the sintering temperature. Optionally, an intermediate bond coating of a material such as platinum, platinum aluminide, or MCrAlY (where M=Co, Ni or Co/Ni) may be applied to the substrate in a thickness such as 5-100 or 5-500 microns for substrate oxidation protection and improved bonding of the ceramic layer.

A ceramic powder may then be applied as a layer 24 onto the substrate 22, for example as a ceramic/binder mixture injected onto the substrate or as ceramic powder that is pressed onto the substrate. Alternately the ceramic powder may be cold-pressed into a compact in a first die, then removed and placed on and pressed against the substrate in a second die 30 for co-sintering. If engineered surface features 40 are formed on the substrate, the ceramic layer 24 mates with those surface features to interlock the two materials together. The substrate 22 and the ceramic powder are then exposed to a co-sintering cycle that densifies the substrate and the ceramic concurrently to a desired respective final density of each layer. This co-sintering bonds the metal substrate and ceramic layer together. The final density may for example be the full density of the substrate, and full or less than full density of the ceramic layer. In any case, the final densities do not change by any effective amount during operation of the component. As an example, the final co-sintering may be done at about 1600-1700° C. for a duration effective to reach the desired final density of each layer, and these final densities do not change within an exemplary operating range of about 0-1500° C., taken from room temperature to a maximum operating temperature.

Figure 5:
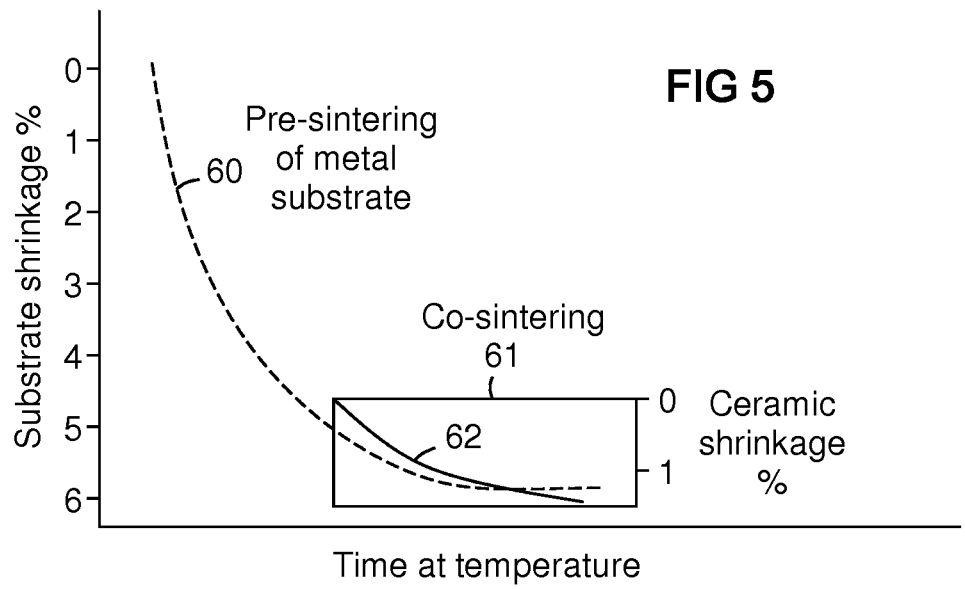
FIG. 5 illustrates shrinkage curves of a metal and ceramic couple during two sintering stages in one embodiment of the invention, including partial sintering of the metal substrate followed by co-sintering of the substrate and ceramic layer thereon.

FIG. 5 illustrates shrinkage curves for partial sintering 60 of a metal substrate followed by co-sintering 61 of the substrate and a ceramic layer after application of the layer. In this example, during the two sintering steps 60, 61, the metal shrinks about 6%, whereas during the co-sintering 61 step, which is the sole sintering step 62 for the ceramic, the ceramic shrinks about 1.5%. However, the metal and ceramic shrink about the same amount during the co-sintering step 61.

Normally, ceramic has a much higher sintering temperature than metal. This makes co-sintering of metal and ceramic layers impractical since the metal can melt and lose some of its characteristics and surface features. A conventional sinterable ceramic powder may have an average particle diameter of over 1 micron or over 10 microns or particles in a range of 10-45 microns. Inclusion of nano-scale ceramic particles can reduce the sintering temperature by as much as 350° C. in some embodiments, which can allow effective co-sintering and bonding of the metal and ceramic layers if the thermal expansion coefficients of the two materials are compatible. This sintering temperature reduction occurs particularly when the ceramic powder comprises at least 1%, or at least 2%, and up to 100% by volume of particles less than 100 nm average diameter, and it especially occurs with particles less than 50 nm average diameter. The fewer nano-particles there are in the powder, the less is the effect, and the more nano-particles there are, the higher is the sintering shrinkage. Thus, a percentage of nano-particles may be selected to match the final sintering shrinkage/temperature curve of a given substrate material. Exemplary suitable nano-particle proportions include 2% to 50% and especially 5% to 40% ceramic nano-particles (less than 100 nm or less than 50 nm) by volume in the ceramic powder.

A material couple comprising a metal material and a ceramic material may be selected that have respective coefficients of thermal expansion (CTE) within 15% or, in some embodiments, within 10% of each other throughout the operating range plus the co-sintering range of the two materials. For example, if the design operating range is 0-1500° C. and the co-sintering range is 1600-1700° C., then the respective CTEs may be matched within the above tolerances from 0-1700° C. For example, if a metal alloy has a CTE of $8 \times 10^{-6}/°$ C. at a given temperature, then a ceramic material meeting the 15% criterion has a CTE at that temperature of $(8 \pm 15\%) \times 10^{-6}/°$ C. or $(6.8$ to $9.2) \times 10^{-6}/°$ C. In other embodiments the respective CTEs may be matched within the above tolerances from 0-1400° C.

The material couple may be further selected to have respective co-sintering shrinkage curves that stay within 5.0% or each other, or within 1.0% of each other, and especially within 0.6% of each other, at each temperature throughout the co-sintering stage. This means that, after pre-sintering the substrate to a predetermined portion of its final density, such as between 85%-90% of full density, the remaining shrinkage of the substrate and the total shrinkage of the ceramic during co-sintering stay within the above limits. For example, if a metal alloy substrate is pre-sintered to 85% of full density, and this leaves a remaining shrinkage of 1.5% at 1650° C., then to be within 1.0% of each other, the ceramic material after injection or compaction should have a co-sintering shrinkage of 0.5 to 2.5%, or to be within 0.6% of each other, 0.9 to 2.1% at 1650° C.

In another embodiment of the invention, the particle size distribution of the substrate and ceramic layer is selected to control sintering shrinkage of the two materials such that co-sintering of the material pair can be achieved with a desired and acceptable degree of sintering mismatch without the necessity of pre-sintering the substrate.

Examples of compatible material couples are shown in Table 1 below, where MoCu is a molybdenum-copper composite powder. ODS means oxide dispersion strengthened metal alloy. In the table below, the exemplary ODS is based on $FeCrSi$—$Y_2O_3$. The term "8 mol YSZ" means yttria-stabilized zirconia ($ZrO_2$ with 8 mol % $Y_2O_3$). Further high-temperature metals, including superalloys, may be matched with these and other ceramics using the methods and parameters described herein.

TABLE 1

| Pair | Metal | CTE $10^{-6}/°$ C. | Ceramic | CTE $10^{-6}/°$ C. |
|---|---|---|---|---|
| 1) | MoCu | 7.6-8.5 | $Al_2O_3$ | 7.0-8.4 |
| 2) | Ta | ~6.5 | $Al_2O_3$ | 7.0-8.4 |
| 3) | ODS | ~10.8 | 8 mol YSZ | ~10.5 |

Several powdered materials that meet the compatibility criteria described above cannot normally be sintered or co-sintered due to their constituents forming oxides that block particle cohesion or adhesion. However, the inventors found that spark plasma sintering (SPS) overcomes this limitation; both in sintering the metal substrate and the ceramic layer, and in the co-sintered bond between them, possibly due to ionic stripping of the oxides. For example, the inventors found that co-sintering $FeCrSi$—$Y_2O_3$ and 8 mol YSZ using spark plasma sintering under the conditions described herein provides an uncharacteristically strong metal/ceramic bond, which is not normally possible with these types of materials. SPS quickly generates high heat precisely at the inter-particle contact points and near points, cleaning and fusing the particles without overheating the material.

Figure 6:
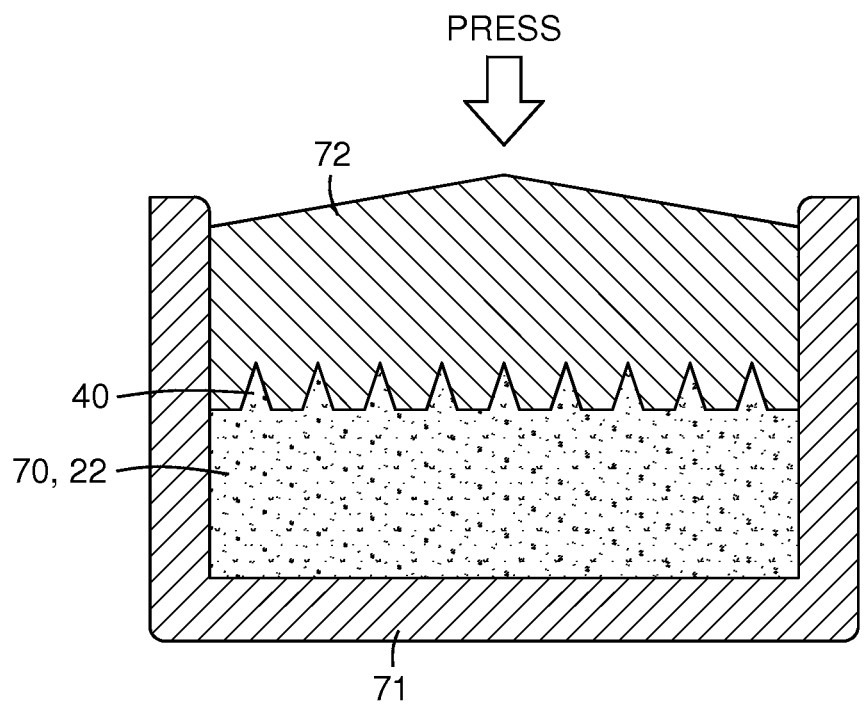
FIG. 6 shows a metal powder/binder being formed, into a substrate with surface features.

FIG. 6 shows a metal powder/binder 70 being formed into a substrate 22 in a mold or die 71. The mold may have a form 72 that may operate as a piston, which forms interlocking surface features 40 on the substrate. These interlocking features may have convex or concave geometries such as cones, pyramids, cylindrical depressions, and the like. The surface features 40 may be fabricated by mixing the metal powder with a binder such as a polymeric binder, then injecting or pressing the metal/binder in the mold. The metal/binder may be heated in the mold of FIG. 6, causing the binder to melt and flow with the metal powder into the surface patterns of the form 72. Interlocking features 40 such as protrusions with undercuts may be formed using a thin flexible form that can be removed from the undercuts after cooling, or they may be formed by other known means. After the surface features are formed, the substrate optionally may be partially sintered prior to application of a ceramic coating. The substrate may form a wall of a gas turbine component, such as a combustor wall, transition duct, turbine shroud, vane, or blade.

Figure 7:
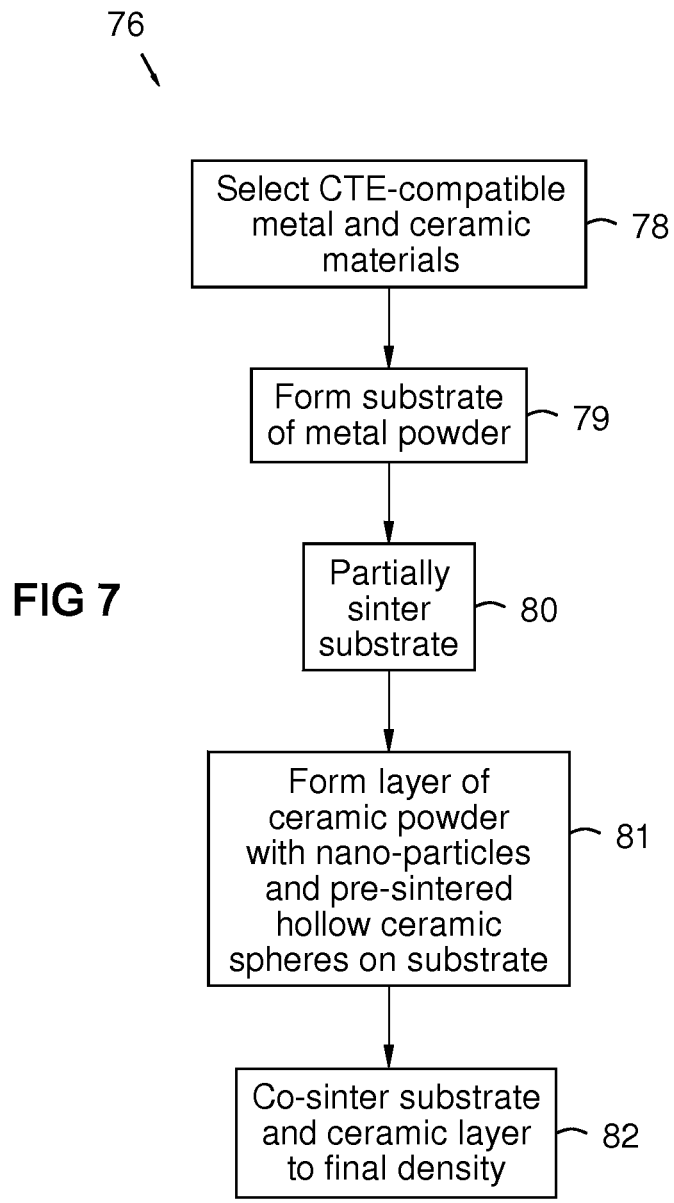
FIG. 7 illustrates steps of one embodiment of the invention.

FIG. 7 shows a fabrication process 76 in accordance with one embodiment of the invention with steps of: 78—Selecting CTE-compatible metal and ceramic materials; 79—Forming a substrate from a powder of the metal material; 80—Partially sintering the substrate; 81—Forming a layer on the substrate from a powder of the ceramic material containing nano-particles; and 82—Co-sintering the substrate and the layer to final density.

Figure 8:
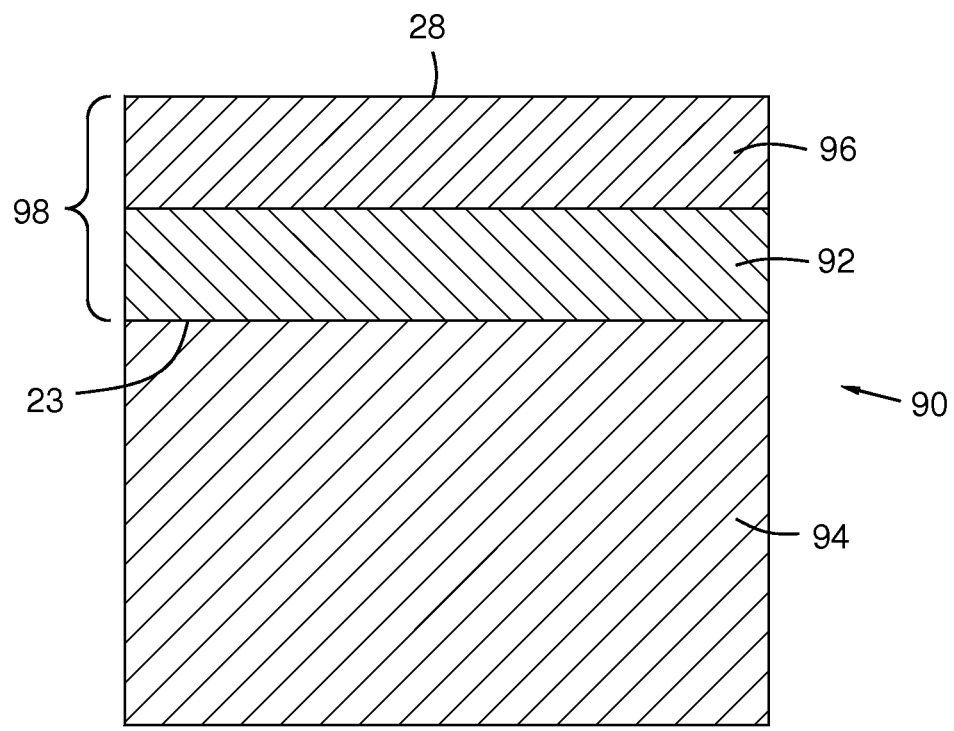
FIG. 8 is a cross-sectional view of a gas turbine component in accordance with an aspect of the invention.

In an embodiment of the present invention, cold powders are engineered to be cooperatively matched for both sintering shrinkage and thermal expansion coefficients and are cold pressed into individual layers, and then they are stacked into a graphite die and sintered with a Spark Plasma Sintering process. More than two layers may be used, as illustrated in FIG. 8, such as when a refractory/ceramic powder layer 92 is bonded between a refractory metallic substrate and a ceramic layer 96 to produce a graded interlayer co-bonded structure 90 such as may be useful as an erosion resistant thermal barrier coating system. Such an embodiment may include co-sintering the intermediate layer 92 including metal and ceramic particles onto the substrate 94, and also co-sintering the top layer 96 having only ceramic particles onto the intermediate layer 92 with a co-processing cycle, wherein the sintering shrinkage of the substrate 94 and that of the intermediate layer 92 stay within 1.0% of each other throughout the co-sintering, and wherein the sintering shrinkage of the intermediate layer 92 and that of the top layer 96 stay within 1.0% of each other throughout the co-sintering. Such a method may be used to produce a gas turbine engine component 90 wherein the intermediate layer 92 and the top layer 96 combine to form a monolithic ceramic layer 98 over 2.0 mm thick. Any of the layers 92, 94, 96 may include a volume fraction of hollow spheres as taught herein.

The resulting co-processed system is dimensionally stable. Embodiments without hollow spheres at least near the outer surface 28, may be used in advanced modular inserts for aggressive, impact resistant, high temperature gas turbine applications. In various embodiments, the methods disclosed herein permit the co-processing of a low expansion alloyed refractory metal system based on chromium, molybdenum, niobium, tantalum, tungsten and/or iron with a sinter-active ceramic powder overlay composition employing a bi-modal particle size distribution of alumina, stabilized zirconia and/or yttrium aluminum garnet powders.

The inventors found that the process used to form the layered material systems herein resulted in a fully coherent strain-free interface 23 consisting of interspersed elements of both metal and ceramic constituents. The resulting bond strength was able to withstand significant thermal cycling without any observed degradation. Such interspersions of ionic and covalent species have rarely been observed.

The processes and materials described herein allow a thicker ceramic layer on a metal substrate than was previously possible. The invention can produce durable ceramic layers over 1.0 mm thick or over 2.0 mm thick in some embodiments on lower thermal expansion superalloy substrates for use over a wide operating temperature range such as 0-1000° C. or 0-1500° C. in some embodiments. The dense ceramic matrix protects the metal substrate against oxidation. The less oxygen reaches the metal the less phase change and oxidation will occur, reducing spalling from the substrate. In conventional TBCs, porosity is used to reduce thermal conductivity. The invention provides porosity that is comparable to or better than prior TBCs, while also providing the capability and stability of a fully densified ceramic structure.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of fabricating a powder-based material system having stable porosity, comprising:
    selecting a metal material and a ceramic material with respective coefficients of thermal expansion that are within 15% of each other throughout an operating temperature range plus a co-sintering temperature range;
    forming a substrate from a powder of the metal material;
    arranging a layer on the substrate, wherein the layer comprises a powder of the ceramic material containing at least 1% by volume of ceramic nano-particles having an average diameter of less than 100 nm and a plurality of hollow ceramic shapes; and
    co-sintering the substrate and the layer under mechanical pressure within the co-sintering temperature range effective to form a bond there between and to achieve a final density of the substrate and a final density of the layer providing a material system with a stable degree of porosity during subsequent operation in the operating temperature range.

2. The method of claim 1, further comprising:
    partially pre-sintering the substrate prior to the co-sintering;
    performing the co-sintering by spark plasma sintering (SPS) while producing the mechanical pressure by compressing the substrate and the layer with an SPS electrode; and
    wherein the hollow ceramic shapes comprise spheres selected or formed with a wall thickness relative to a diameter thereof, and are pre-sintered sufficiently to withstand the mechanical pressure without flattening the spheres to less than a 0.7 aspect ratio.

3. The method of claim 2, further comprising providing a volume fraction of the spheres that varies in the layer with distance from the substrate.

4. The method of claim 1, further comprising:
    forming the substrate from a mixture of the metal powder and a binder that forms a metal/binder mixture;
    forming a surface of the substrate that provides engineered interlocking surface features on the substrate; and
    forming the layer by filling the interlocking surface features on the substrate with the ceramic powder to provide an interlock there between.

5. The method of claim 1, further comprising:
selecting the metal and ceramic materials to be a material couple from the set of material couples consisting of: MoCu and $Al_2O_3$; Ta and $Al_2O_3$; and FeCrSi—$Y_2O_3$ and 8 mol YSZ; and
applying a voltage across the layer and the substrate effective to produce the final density of the substrate and the final density of the layer by spark plasma sintering.

6. The method of claim 1, further comprising forming the substrate to further comprise a plurality of hollow shapes.

7. The method of claim 1, further comprising selecting and preparing the metal material, the ceramic material, the percentage of ceramic nano-particles, and a volume fraction of the hollow ceramic shapes such that the co-sintering produces respective shrinkage amounts of the layer and the substrate that are within 5% of each other throughout the co-sintering thereof.

* * * * *